United States Patent
Hop Hing et al.

(10) Patent No.: US 7,412,465 B2
(45) Date of Patent: Aug. 12, 2008

(54) METHOD FOR APPEND MODE INSERTION OF ROWS INTO TABLES IN DATABASE MANAGEMENT SYSTEMS

(75) Inventors: Nelson Hop Hing, Scarborough (CA); Matthew J. Spilchen, Richmond Hill (CA); Michael J. Winer, Markham (CA)

(73) Assignee: International Business Machines Corporation, Armonk, NY (US)

( * ) Notice: Subject to any disclaimer, the term of this patent is extended or adjusted under 35 U.S.C. 154(b) by 487 days.

(21) Appl. No.: 10/819,393

(22) Filed: Apr. 6, 2004

(65) Prior Publication Data

US 2005/0234930 A1   Oct. 20, 2005

(51) Int. Cl.
*G06F 17/30* (2006.01)
(52) U.S. Cl. .............................. 707/205; 707/1; 707/2; 707/9; 707/10; 707/101
(58) Field of Classification Search ................. 707/1–3, 707/6–10, 100, 101, 200, 203, 205; 709/215, 709/217; 711/118, 129
See application file for complete search history.

(56) References Cited

U.S. PATENT DOCUMENTS

| | | | | |
|---|---|---|---|---|
| 5,666,532 A * | 9/1997 | Saks et al. | ................... | 707/205 |
| 5,717,919 A | 2/1998 | Kodavalla et al. | ........... | 395/608 |
| 5,787,433 A | 7/1998 | Plotkin et al. | ............... | 707/101 |
| 5,940,828 A | 8/1999 | Anaya et al. | ................... | 707/8 |
| 6,131,094 A | 10/2000 | Gord | .............................. | 707/8 |
| 6,223,176 B1 | 4/2001 | Ricard et al. | ................... | 707/8 |
| 6,334,134 B1 | 12/2001 | Haderle et al. | .............. | 707/205 |
| 6,360,220 B1 | 3/2002 | Forin | ............................. | 707/8 |
| 6,363,387 B1 | 3/2002 | Ponnekanti et al. | ........... | 707/10 |
| 6,411,964 B1 * | 6/2002 | Iyer et al. | .................... | 707/200 |
| 6,430,260 B1 | 8/2002 | Snyder | ....................... | 378/130 |
| 6,470,360 B1 * | 10/2002 | Vaitheeswaran | ............ | 707/205 |
| 6,480,862 B1 * | 11/2002 | Gall | ............................... | 707/3 |
| 6,487,567 B1 | 11/2002 | Michelman et al. | ......... | 707/525 |
| 6,578,131 B1 | 6/2003 | Larson et al. | ................. | 711/216 |
| 2002/0040376 A1 | 4/2002 | Yamanaka et al. | .......... | 707/530 |
| 2006/0230013 A1 * | 10/2006 | Hrle et al. | ...................... | 707/1 |

* cited by examiner

*Primary Examiner*—Wilson Lee
*Assistant Examiner*—Marc R Filipczyk
(74) *Attorney, Agent, or Firm*—Sughrue Mion, PLLC

(57) ABSTRACT

Implementation of append mode concurrent insert operations in tables in a page-based concurrent relational database management system is carried out by defining a set of last pages as a current cache into which rows may be inserted by appenders. Append mode insert operations for each page in the current cache are serialized. Appenders seek to access the pages in the current cache using a two-pass process in which latches are sought to be acquired conditionally in the first pass and unconditionally in the second pass. A shared data structure is provided to define a current cache and a next cache for a table supporting append mode inserts in the relational database. The shared data structure includes information reflecting the unused space for each page in the current cache.

17 Claims, 1 Drawing Sheet

METHOD FOR APPEND MODE INSERTION OF ROWS INTO TABLES IN DATABASE MANAGEMENT SYSTEMS

FIELD OF THE INVENTION

The present invention relates generally to database management systems and more specifically to a system, method and computer program product for append mode insertion of rows into tables maintained by database management systems.

BACKGROUND OF THE INVENTION

Relational database management systems ("RDBMSs") typically include features that allow users to select different options that may be used to provide increased efficiency for the operations of the RDBMSs. These will allow users to take advantage of potential operational improvements that relate to characteristics of the data and/or systems An example of such a user-selectable feature is where, for a page-based RDBMS, a user is able to define tables as being append mode or otherwise. When a row is added to an append mode table the new row is added at the end of the table, there is no search for unused space in the table. In the case where the relational database is organized in pages, such an append mode table insert is defined to occur in the last page in the table. An example of such a system is the DB2™ relational database management system of International Business Machines Corporation. A table in a DB2™ database may be defined to be an append mode table, as is described above.

In addition, an RDBMS may carry out an insert operation on a table using an append mode insert operation in certain circumstances, whether or not the table itself has been specified to be append mode by a user. For example, where the existing pages in a relational table have only a limited amount of free space, the RDBMS may determine that the most efficient way to insert rows in the table is by an append mode insert operation (the rows are added at the end of the table).

Where an append mode functionality is implemented in a page-oriented relational database system that is concurrent, different processes (or agents) may seek to concurrently insert rows in the table. As a result of the concurrency support in such systems, the processes seeking to insert data in the last page of the table will each seek to acquire exclusive rights to write to that page before executing the insert operation. Different processes will be potentially delayed in accessing the table as a result of the mechanisms used to implement the concurrency in the relational database management system. In highly contentious environments there will be multiple processes seeking access which may reduce the efficiency of the relational append mode insert operation.

It is therefore desirable to provide a method, system and computer program product for use in a relational database management system to improve the efficiency of concurrent append mode insert operations carried out in a relational database system.

SUMMARY OF THE INVENTION

Accordingly, the system, method and computer program product of the present invention provide for improved relational database management systems.

According to an aspect of the present invention there is provided a method and system for the implementation of append mode insert operations in a page-based concurrent relational database management system such that a set of last pages (a current cache) is defined into which rows may be concurrently inserted by appenders. According to an aspect of the invention each page in the current cache is defined to have a mechanism for acquiring exclusive access to ensure appropriate serialization of concurrent appenders, such as a latch mechanism. Appenders seeking to access the pages in the current cache do so by a two-pass process in which exclusive access is sought to be acquired conditionally in the first pass and unconditionally in the second pass. A shared data structure is provided to define the current cache and a next cache for each selected table in the relational database for which append mode insert operations are potentially executable. The shared data structure includes information reflecting the unused space for each page in the current cache and the information is used by appenders seeking to insert rows into the selected table.

According to an aspect of the present invention there is provided a computer program product for implementing append mode insert operations in a concurrent relational database management system in which table data is stored in pages and in which appenders are able to concurrently access pages in each of the tables, the computer program product including a computer usable medium having computer readable program code means embodied in the medium, and including computer readable program code means for defining a set of pages in a selected table to be a current cache for the table, and computer readable program code means for implementing append mode insert operations for the selected table by permitting appenders to concurrently insert rows into a plurality of pages in the current cache.

According to another aspect of the invention there is provided the above computer program product, further including computer readable program code means for defining and maintaining a shared data structure accessible by appenders for defining the current cache and a next cache for the selected table.

According to another aspect of the invention there is provided the above computer program product in which the shared data structure includes indicators of unused space for each page in the current cache.

According to another aspect of the invention there is provided the above computer program product, further including computer readable program code means for an appender to carry out a determination that the pages in the current cache are full, computer readable program code means to replace the current cache with the next cache when the current cache is determined to be full, and means for the appender to define a set of pages to become successively defined as the next cache.

According to another aspect of the invention there is provided the above computer program product further including computer readable program code means for determining the number of pages in the set of pages to become successively defined as the next cache by comparing collected statistics for the relational database management system with a measure of the number of appenders.

According to another aspect of the invention there is provided the above computer program product further including computer readable program code means for defining and managing a latch for each page in the current cache, computer readable program code means to prevent an appender from inserting rows to a selected page in the current cache unless the appender has acquired the latch for the selected page.

According to another aspect of the invention there is provided the above computer program product in which the computer readable program code means for defining and managing a latch for each page in the current cache further includes means for permitting appenders to acquire the latch either conditionally or unconditionally.

According to another aspect of the invention there is provided the above computer program product further including computer readable program code means for defining a two-pass mechanism for an appender seeking to insert rows into the pages in the current cache whereby the appender will seek to conditionally acquire exclusive access to the pages in the current cache in the first pass and will seek to unconditionally acquire exclusive access to the pages in the current cache in the second pass.

According to another aspect of the invention there is provided the above computer program product further including computer readable program code means for preventing the appender from seeking to acquire a latch for a page in the current cache where the unused space for the page is smaller than the size of the row that the appender seeks to insert into the selected table.

According to another aspect of the invention there is provided the above computer program product( ) further including computer readable program code means for commencing the two-pass mechanism at different pages in the current cache for different appenders.

According to another aspect of the invention there is provided the above computer program product further including computer readable program code means for maintaining a shared data structure latch for managing concurrent access to the shared data structure.

According to another aspect of the invention there is provided the above computer program product further including computer readable program code means for permitting other appenders to access a newly defined current cache immediately after its replacing a previously defined current cache that has become full.

According to another aspect of the invention there is provided a computer-implemented method for an appender to carry out a concurrent append mode insert of a row into a table maintained by a page-based relational database system, the system defining a set of pages in the table to be a current cache, and the system providing a serialization mechanism to allow exclusive access to be acquired by an appender for each page in the current cache, the method including the steps of the appender seeking to acquire exclusive access for respective pages in the current cache, and the appender writing to a selected page in the current cache for which exclusive access has been acquired.

According to another aspect of the invention there is provided the above method further including the step of the appender determining whether a respective page in the current cache has available unused space whereby the appender will not seek to acquire exclusive access for the page on the determination that there is insufficient available unused space.

According to another aspect of the invention there is provided the above method in which the step of the appender seeking to acquire exclusive access for respective pages in the current cache includes the steps of carrying out a first pass through the pages in the current cache in which the exclusive access for each of the respective pages is sought to be acquired by the appender conditionally, and carrying out a second pass through the pages in the current cache in which the exclusive access for each of the respective pages having free space in excess of a defined limit is sought to be acquired by the appender unconditionally.

According to another aspect of the invention there is provided the above method further including the step of seeking to acquire exclusive access for a page on a conditional basis on the second pass where the page has free space to accept the row but has less free space than the defined limit.

According to an aspect of the present invention there is provided a computer program product including a computer-readable signal-bearing medium, such as a recordable data storage medium or a modulated carrier signal (including a transmission over a network such as the Internet), the medium including means for accomplishing the above methods.

The present invention thus permits relational databases to carry out concurrent append mode insert operations to add rows to tables in a manner that reduces contention for pages at the end of the tables.

BRIEF DESCRIPTION OF THE DRAWINGS

In a drawing which illustrates by way of example only a preferred embodiment of the invention.

DETAILED DESCRIPTION OF THE EMBODIMENTS

Figure 1:
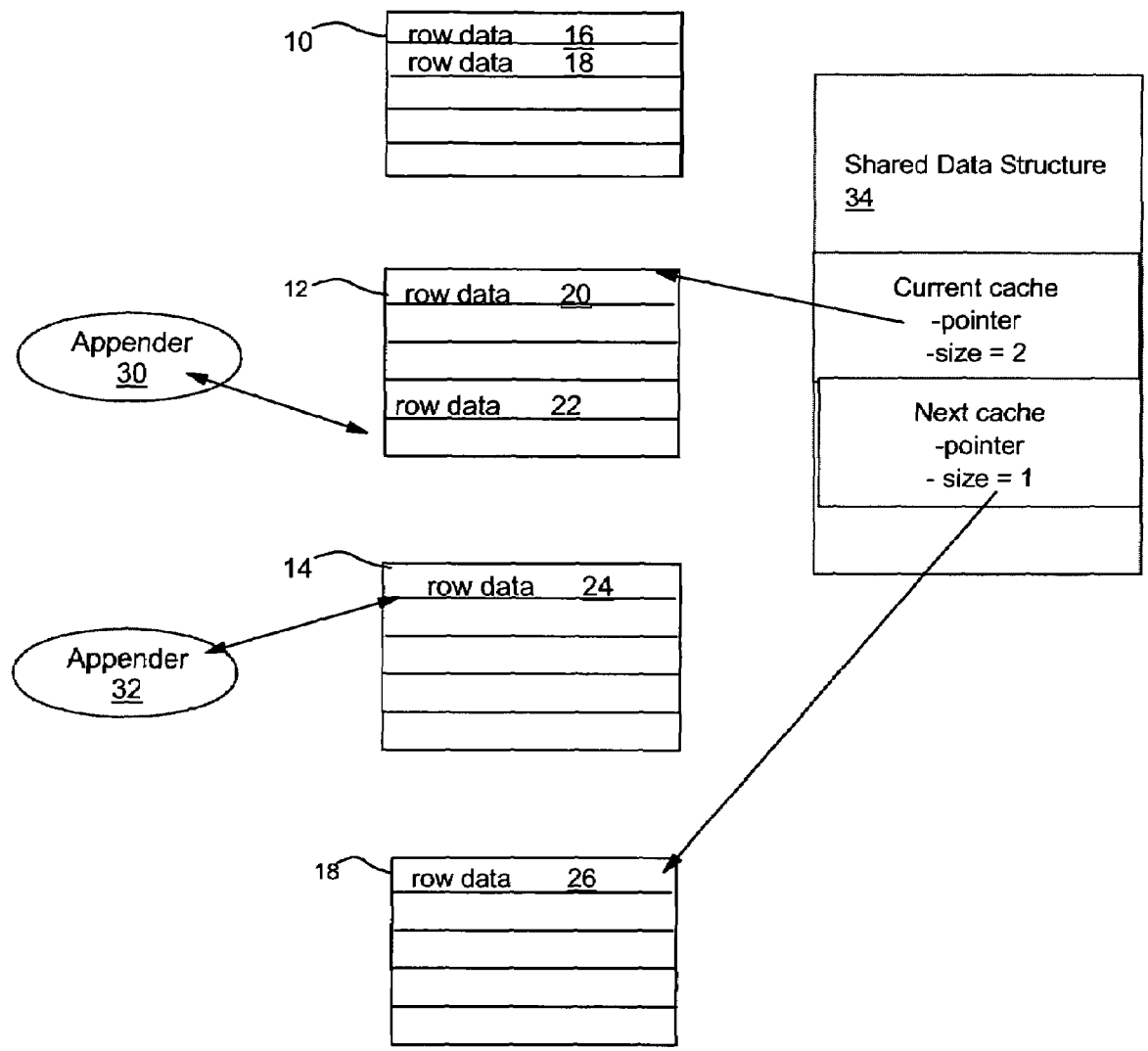
FIG. 1 is a block diagram illustrating pages, appenders and a shared data structure maintained by the RDBMS of the preferred embodiment.

The preferred embodiment is described with reference to a relational database management system (RDBMS) that is concurrent. The RDBMS of the preferred embodiment is organized such that tables are stored in pages. Operations on data in the tables of the RDBMS are carried out with reference to the pages in which the data is stored. Data is accessed according to the page on which it is found. The RDBMS maintains a set of pages that contain the data in any given table and the RDBMS reads data and writes data to that set of pages to access and maintain the table data for that given table.

FIG. 1 is a block diagram illustrating example pages as maintained by the RDBMS of the preferred embodiment. The example of FIG. 1 includes two sets of pages, as will be described in more detail below: a first set (or current cache) including pages 10, 12, 14, 16 and a second set 18, 20 (or next cache). Although not depicted in FIG. 1, pages in the first set of pages (or current cache) may contain table data. The row data will occupy potentially differing amounts of space in the pages. Each page will therefore have a certain amount of free, or unused, space. This amount of free space on each page is expected to vary over time.

In previous implementations of RDBMSs, an append mode insert operation is defined such that new rows are inserted in a table only in a single specified last page of the table. When carrying out an append mode insert in such systems, the free or unused space on pages other than the last page are not made available for newly inserted rows.

For an RDBMS such as that of the preferred embodiment, where concurrent inserts are supported, a mechanism to serialize access to pages and thereby manage read-write conflicts must be put in place. Such a mechanism is typically implemented using serializing techniques such as latch or lock mechanisms. In systems in which data is organized by pages, the serializing mechanism may be associated with pages. For a page to be accessed, a right to access will be acquired before the accessing operation is carried out (such access may be shared or exclusive). The preferred embodiment describes the serializing mechanism as a latch mechanism but other implementations may use other mechanisms.

In the preferred embodiment, an operation on the database is executed by an agent that may execute concurrently with other agents. Thus an agent that is performing the role of appending a row to the table ("an appender") must acquire an exclusive latch on the page in question before inserting data on that page. In other systems, the RDBMS architecture may not be based on the use of agents. In such systems other mechanisms may be used to allow concurrent processes or threads to access data stored in tables in the RDBMSs. Although the description below refers to appenders, which are agents in the preferred embodiment, it will be apparent to those skilled in the art that appender operations may be implemented using other approaches used to implement concurrency in other RDBMS architectures.

Where an append mode insert operation is carried out by adding only to the last page in the table, contention amongst appenders may be high for the last page exclusive latch. Where there are a number of potential appenders seeking to insert rows into the append mode table, appenders will wait on the availability of the exclusive latch that will permit an appender to access the page at the end of the table. If there are a number of such active appenders, this implementation of the append mode insert operation may become relatively inefficient.

According to the preferred embodiment, a shared data structure is provided that is accessible to appenders in the RDBMS and used by the system in defining and accessing append mode tables. The shared data structure is used to define a cache that identifies pages for use in append mode table insert operations, as described in more detail below. In the preferred embodiment, a current cache and a next cache are defined. A cache is a set of pages that are made available in the RDBMS for adding rows to an append mode table.

The current cache of the preferred embodiment defines a set of last pages in a table maintained by the RDBMS. According to the preferred embodiment, when an append mode insert operation is carried out on a table in the RDBMS, a new row may be potentially added to any one of the pages with sufficient space to store the row that are in the current cache. This approach to implementing an append mode insert operation will typically lessen the potential contention for page access required to carry out the append mode insert operation.

The approach of the preferred embodiment is shown with reference to the example of FIG. 1. In the simple example of FIG. 1 there are two appenders 30, 32 shown. To carry out an append mode insert operation, each of appenders 30, 32 is able to potentially insert rows into the portion of the table stored on pages in a defined set of pages referred to as a current cache, namely 10, 12, 14, 16. According to the preferred embodiment, shared data structure 34 is provided such that the set of appenders is able to access the information in shared data structure 34.

As shown in FIG. 1, in the preferred embodiment shared data structure 34 includes data elements that are able to identify pages forming a current cache and a next cache. The current cache data reference in shared data structure 34 includes a pointer to the first page in the current cache (page 10 in the example of FIG. 1), and an indication of how many pages are in the current cache (four pages in the FIG. 1 example). Similarly, shared data structure 34 includes a next cache data element that points to the first page in the next cache (page 18) and specifies the number of pages in the next cache (two pages). In the preferred embodiment, pages are ordered and therefore a reference to a first page and the number of pages in the cache is sufficient to identify all pages in the cache.

In the preferred embodiment the number of pages in the current cache is related to the number of active appenders. System performance statistics are analyzed to determine a preferred ratio of appenders for each page in the current cache. The cache size (number of pages in the cache) is determined by arriving at a number reflecting actual and expected active appenders and calculating a cache size to meet the preferred appender to page ratio.

By defining a set of last pages to be a current cache, as is set out above, concurrent append mode insert operations may be carried out without appenders waiting for the availability of a single page. Instead, an appender will add to the next available page in the set of last pages in the current cache (when the current cache becomes full, the next cache is used, as is described in more detail below). The preferred embodiment provides a mechanism to accomplish this result.

An exclusive latch for a page in the current cache of the preferred embodiment is obtained as part of an append mode insert operation in one of two ways: a conditional acquisition of the latch or an unconditional acquisition of the latch. As indicated, shared data structure 34 stores information that reflects the free space for each page in the current cache (pages 10, 12, 14, 16 in the example of FIG. 1). The approach of the preferred embodiment includes logic to compare the size of the row to be inserted in the table with the free space in the pages in the current cache (the defined set of last pages). The preferred embodiment maintains information about the free space in each of the pages in the set of last pages (pages in the current cache) in shared data structure 34. Thus in the example of FIG. 1, appender 30 checks shared data structure 34 to determine if any of pages 10, 12, 14, 16 are indicated as having sufficient free space for the row to be inserted to fit into the unused space in the page. Only when shared data structure 34 indicates that sufficient free space is available will an appender seek to acquire an exclusive latch for the page.

In the preferred embodiment, because data structure 34 is potentially accessible by multiple appenders in the concurrent RDBMS, there is a latch associated with shared data structure 34, itself. To further improve efficiency, the shared data structure's record of free space on a page is updated only where the unused space in the page is less than twice the size of the currently inserted record (where only one more record, or row, of that size will be able to be inserted into the page).

As is set out above, the size of the unused space in the pages in the current cache is recorded in the shared data structure and used by appenders in determining whether to seek to acquire a latch for a given page in the set of last pages (current cache). Due to the concurrency of appenders and other agents, page free space recorded in the shared data structure and accessed by the appender may not reflect the actual free space on a page at the time that the appender acquires the exclusive latch for the page. The latch mechanism also uses two types of latch acquisitions to carry out the contention resolution process. The preferred embodiment defines latch acquisition as being conditional or unconditional.

When an appender seeks to obtain an exclusive latch for a page conditionally there are two potential results: (a) if the page is already latched by another appender or agent then the conditional page latch acquisition step will return the status of the page (latched by another appender or agent), or (b) if the page is not latched by another appender or agent then the conditional latch acquisition operation will latch the page for the appender seeking to acquire the latch (the latch will be acquired by the appender). For unconditional latch acquisition, the appender will either obtain the latch (where the page is unlatched) or it will wait for the page to become unlatched in the case where the page is latched by another appender or agent at the time that the unconditional latch is requested for the page. It will be noted that in the preferred embodiment, and in other similar systems, the exclusive access right represented by the latch may be acquired by other agents for reasons other than carrying out an append mode insert. Such a latch acquisition will similarly effect the way in which the appender seeks to acquire the latch as described above. For example, a read operation may require the latch.

The two types of latch acquisition are used by the preferred embodiment in a double-pass approach. An appender will first seek to obtain a latch for pages in the current cache by using a conditional latch acquisition. The appender commences at a selected page in the current cache (as defined below). If the shared data structure indicates that there is appropriate free space on the selected page, the appender seeks a latch for that initial page on a conditional basis. Should the conditional latch acquisition step return the result that the page is latched, the appender will then move to the next page in the current cache that is indicated in the shared data structure to have sufficient free space (the pages in the subset of the current cache that have sufficient unused space may be termed the "candidate pages"). If the conditional latch acquisition step is successful in acquiring a latch for a page, the appender will insert a row in the page, if space exists. In the example of FIG. 1, appender 30 is shown inserting a row in table page 12. To carry out this operation, appender 30 has acquired the latch for page 12. Similarly, appender 32 is shown in FIG. 1 inserting a row in page 14.

After the latch for the selected page is acquired, the appender determines that there is, in fact, sufficient free space on the page (in the preferred embodiment, the free space is recorded as part of the page data structure itself). If there is no such free space, the appender will proceed to consider the next page in the current cache.

The appender will cycle through all candidate pages (all pages that are indicated by the shared data structure to have sufficient free space) in the current cache seeking to obtain a latch using the conditional latch acquisition step. If the result returned for all such candidate pages in this first pass indicates that the pages are latched, the appender will then carry out a second pass (if there are no such candidate pages, there will be no second pass as the assumption made is that there is no available space in the pages in the current cache). On the second pass through the pages in the current cache the appender will seek to acquire a latch on an unconditional basis (subject to the exception referred to below).

As with the first pass through the current cache, the appender will access the free space indicator in the shared data structure for a selected page. In the preferred embodiment, where the shared data structure indicates that the page has only space for one additional row, the appender will seek to acquire that page latch on a conditional basis. In the example of FIG. 1, where appender 30 has acquired a latch for page 12 and another appender seeks to acquire the latch, data structure 34 may indicate that the free space in page 12 is only large enough for one row. The other appender will therefore seek to acquire the latch on a conditional basis. This approach is followed based on the optimistic assumption that appender 30 (having the latch for page 12) will use up the last available free space in page 12.

Where, however, an appender is on the second pass through the current cache and the shared data structure indicates that the page currently being considered (the current page) has free space for more than one row of the current row size, the appender will seek to acquire the latch on an unconditional basis. Where the current page is not latched, the latch will be acquired by the appender and the row will be added to the current page, if there is space. Where the current page is latched at the time that the appender seeks to acquire the latch, the appender will wait on the page until the appender is granted access to the page (the agent holding the latch relinquishes it and the appender is able to acquire the latch). The implementation of the concurrent latching mechanism is understood by those in the art. The logic followed by the appenders in seeking the latches is dictated by the above description and in differing systems may be designed to be compatible with the particular implementations of the latching mechanisms used in different RDBMSs.

The following pseudo-code reflects the logic implemented in the appender relating to finding a page within the current cache into which a row of data is to be inserted. The appender will potentially make two complete passes through the pages. The passes are defined by "starting entry" and "stop entry" which are pages in the current cache. In the preferred embodiment, the starting entry is calculated to give different pages for different appenders (the preferred embodiment selects the starting entry by taking a variable number such as a transaction identifier, for example, and applying the mod function using the size of the cache).

```
/* stagger the starting entries for different appenders */
- calculate starting entry in the cache
    /* set stop entry */
    - if starting entry = first entry in cache
    - set stop entry = last entry
    else
    - set stop entry = starting entry – 1
    /* initialize latch mode - conditional for first pass */
    - latch mode = conditional
    - store current cache page ID from shared data structure
    /* loop for two passes of the pages in the cache*/
    - loop
- if shared data structure indicates enough free space
for insert row
        - if free space >= 2 * row size
    - latch page using latch mode
        else
    - latch page conditionally
    - if page latch is acquired
        - check for space on page
        - if current free space on page is insufficient for
row to insert
    - update shared data structure with current free
      space
        - if current free space <= 2 * row size
- update shared data structure with current free space after row inserted
        - if space available on page
    - return the page for append action
        else unlatch page
    - if (stored cache ID not equal to current cache ID)
      or (no space in cache pages)
    - if no space in cache pages
    - request a new cache
        - restart search /* look for pages in next cache */
    - else
/* optimization to move stop entry based on location of pages with
    available space */
    - if conditional latch failure
    - move stop entry to be current entry on
      second iteration
        - if first iteration of cache complete
    /* define latch mode for second pass */
    - latch mode = unconditional
        /* cycle through pages in the cache */
        - if current entry < last entry
- current entry = current entry + 1
else
- current entry = first entry
```

The above technique makes possible a reduction in contention for last pages in an append mode table. The preferred embodiment also provides for the current cache to be replaced with a new cache containing new pages. A simple example illustrating the replacement of a current cache with a new cache is shown with reference to FIG. 1. Shared data structure 34 is shown with a data element defining a current cache by pointing to page 10. Shared data structure 34 also maintains the size of the current cache (in the simple example of FIG. 1, the size is expressed as 4 pages).

When an appender determines that the current cache is full, the appender will cause a new cache to be created. In the example of FIG. 1, the appender will use the next cache pointer in shared data structure 34 to identify page 18 as the next cache and will redefine the current cache pointer to reference page 18. In the preferred embodiment, pages in the next cache, such as page 18 in FIG. 1, are previously defined. Thus, for example, page 18 is immediately available for insertion of rows.

After the appender has redefined the next cache to be the current cache, that appender creates a new next cache (not shown) with the new pages required for the cache. In effect, the previously defined current cache that is full is replaced and new pages are defined to become successively defined as the next cache. In the preferred embodiment, this approach to cache creation permits a single log entry to be written in the RDBMS log, which will reflect all pages created. Following the creation of the new next cache, the appender sets the next cache pointer in shared data structure 34 to point to the new next cache.

Example pseudo-code shows how a new cache may be defined as described above. The pseudo-code has several lines that are necessary due to the concurrent nature of the RDBMS. The example set out below refers to appendCacheLatch and nextCacheLatch, two latches that must be acquired to allow the cache definitions in the RDBMS to be altered.

```
- if a new cache has already been made available return
- acquire appendCacheLatch exclusively
- if a new cache has already been made available
    release appendCacheLatch and return
- acquire the nextCacheLatch exclusively
/* replace current cache with next cache */
- if a nextCache pointer in the shared data structure exists
    - redefine currentCache pointer = nextCache pointer
    - reset free space indicators for the current cache
        - release the appendCacheLatch
    /* set up new next cache with pages */
    - calculate the number of pages needed for the next cache
    - create pages for the next cache
    - write a single log record for all pages created for the
        next cache
    - update the nextCache pointer in the shared data structure
    - release the nextCacheLatch
```

As will be appreciated, the above approach relies on two latches being used. The appendCacheLatch must be acquired exclusively before switching the next cache to become the current cache. This ensures that only one appender is able to change the cache. Because there is no input/output operation required to switch caches, this latch is only held for a relatively short period. Another latch is also used in the preferred embodiment to ensure correct concurrent operation while new pages are created for the next cache. In the preferred embodiment dead latches are eliminated by providing that this latch (nextCacheLatch) is only acquired when the appender has exclusive access to the appendCacheLatch. The latch is released after the required number of new pages in the next cache are created.

In some implementations, the appenders may not carry out the creation of the next cache but rather cause another process to do so. This approach will potentially remove the overhead for the creation from the appender. In such a case the appender will preferably switch the current cache so that it points to what was previously a next cache (if one exists). In such a scenario, the responsibility for creating a new next cache will be passed off to another asynchronous database management system process.

In the preferred embodiment, once the appendCacheLatch is released, the newly defined current cache is made available and may be accessed by all appenders. Pages for the next cache are then created. This approach is an alternative to creating pages on demand and is preferable as the likelihood of other appenders waiting is reduced and may be eliminated.

As may be seen from the above description, in the RDBMS of the preferred embodiment the contention for pages in an append mode table is reduced and the response time and/or throughput of concurrent appenders may be increased.

Various embodiments of the present invention having been thus described in detail by way of example, it will be apparent to those skilled in the art that variations and modifications may be made without departing from the invention. The invention includes all such variations and modifications as fall within the scope of the appended claims.

What is claimed is:

1. A computer-implemented method for implementing append mode insert operations in a concurrent relational database management system in which table data of a plurality of tables is stored in pages and in which appenders are able to concurrently access pages in each of the plurality of tables, the method comprising:

defining a set of pages in a table selected among the plurality of table to be a current cache for the selected table, and implementing append mode insert operations for the selected table by permitting appenders to concurrently insert one or more rows into a plurality of pages in the current cache, wherein an appender performs an append mode insert operation to insert one or more rows into a plurality of pages in the current cache utilizing a two-pass mechanism, whereby said appender cycles through the set of pages in the current cache, in a first pass, to conditionally obtain exclusive access to said a page among the plurality of pages in the current cache and if not permitted exclusive access to a page in the first pass, said appender cycles through the set of pages in the current cache, in a second pass, to unconditionally obtain exclusive access to said a page among the plurality of pages in the current cache.

2. The method of claim 1, further comprising defining and maintaining a shared data structure accessible by appenders for defining the current cache.

3. The method of claim 2 further comprising maintaining a shared data structure latch for managing concurrent access to the shared data structure.

4. The method of claim 1 further comprising defining a set of pages to be a next cache for the selected table.

5. The method of claim 4, further comprising: an appender carrying out a determination that the pages in the current cache are full, replacing the current cache with the next cache when the current cache is determined to be full, and the appender defining a set of pages to become successively defined as the next cache.

6. The method of claim 5 further comprising determining the number of pages in the set of pages to become successively defined as the next cache based on a number of active appenders for each page in the current cache.

7. The method of claim 5 further comprising permitting other appenders to access a newly defined current cache immediately after its replacing a previously defined current cache that has become full.

8. The method of claim 1, further comprising defining and maintaining a shared data structure accessible by appenders for defining the current cache and a next cache for the selected table.

9. The method of claim 8 wherein the shared data structure comprises indicators of unused space for each page in the current cache.

10. The method of claim 1 further comprising: defining and managing a latch for each page in the current cache, preventing an appender from inserting rows to a selected page in the current cache unless the appender has acquired the latch for the selected page.

11. The method of claim 10 wherein defining and managing a latch for each page in the current cache further comprises permitting appenders to acquire the latch either conditionally or unconditionally.

12. The method of claim 11 further comprising preventing the appender from seeking to acquire a latch for a page in the current cache where the unused space for the page is smaller than the size of the row that the appender seeks to insert into the selected table.

13. The method of claim 11 further comprising commencing the two-pass mechanism at different pages in the current cache for different appenders.

14. The method of claim 1, further comprising: defining and maintaining a shared data structure accessible by appenders for defining the current cache and a next cache for the selected table, and for each page in the current cache maintaining a record of the amount of unused space for the page, acquiring an exclusive latch for each page in the current cache, and preventing an appender from inserting a row into a selected page in the current cache unless the shared data structure record for the unused space for the selected page indicates that there is sufficient unused space and the appender acquires the exclusive latch for the selected page.

15. The method of claim 1, further comprising: defining and maintaining a shared data structure accessible by appenders for defining the current cache and a next cache for the selected table, and for each page in the current cache maintaining a record of the amount of unused space for the page, an appender using the shared data structure to carry out a determination that the pages in the current cache are full, updating the shared data structure to replace the current cache with the next cache when the current cache is determined to be full, and the appender updating the shared data structure to define a set of pages to become successively defined as the next cache.

16. The method of claim 6, further comprising maintaining a shared data structure latch for managing concurrent access to the shared data structure.

17. The method of claim 16, further comprising permitting other appenders to access a newly defined current cache immediately after its replacing a previously defined current cache that has become full.

* * * * *